US008904352B2

(12) United States Patent
Klein et al.

(10) Patent No.: US 8,904,352 B2
(45) Date of Patent: Dec. 2, 2014

(54) SYSTEMS AND METHODS FOR PROCESSING SOURCE CODE DURING DEBUGGING OPERATIONS

(75) Inventors: Udo Klein, Maximiliansau (DE); Daniel Hutzel, Karlsruhe (DE)

(73) Assignee: SAP SE, Walldorf (DE)

( * ) Notice: Subject to any disclaimer, the term of this patent is extended or adjusted under 35 U.S.C. 154(b) by 934 days.

(21) Appl. No.: 12/801,754

(22) Filed: Jun. 23, 2010

(65) Prior Publication Data

US 2011/0320876 A1  Dec. 29, 2011

(51) Int. Cl.
*G06F 11/36* (2006.01)
*G06F 11/00* (2006.01)
*G06F 9/44* (2006.01)
*G06F 11/32* (2006.01)

(52) U.S. Cl.
CPC ........... *G06F 11/362* (2013.01); *G06F 8/33* (2013.01); *G06F 9/44* (2013.01); *G06F 11/36* (2013.01); *G06F 11/00* (2013.01); *G06F 11/323* (2013.01)
USPC ......................................... 717/124; 714/100

(58) Field of Classification Search
CPC ......... G06F 9/44; G06F 11/00; G06F 11/362; G06F 11/36; G06F 11/323
USPC ......................................... 717/125; 714/38.1
See application file for complete search history.

(56) References Cited

U.S. PATENT DOCUMENTS

| 6,011,539 A * | 1/2000 | Hamilton et al. ............. 345/156 |
| 2003/0221186 A1* | 11/2003 | Bates et al. ..................... 717/125 |
| 2004/0111394 A1* | 6/2004 | Fish et al. .......................... 707/3 |
| 2006/0020595 A1* | 1/2006 | Norton et al. ..................... 707/6 |
| 2009/0148073 A1* | 6/2009 | Jenkins et al. ................ 382/311 |
| 2012/0151451 A1* | 6/2012 | Lindahl et al. ................ 717/128 |

OTHER PUBLICATIONS

Path: lib/active_support/core_ext/string/inflections.rb; Modified Jul. 27, 2008.*
Book, Programming in C++, Neil B. Dale and Chip Weems, pp. 364-365, 2008.*

* cited by examiner

*Primary Examiner* — Jonathan C Teixeira Moffat
*Assistant Examiner* — Lynda Dinh
(74) *Attorney, Agent, or Firm* — Finnegan, Henderson, Farabow, Garrett & Dunner LLP

(57) ABSTRACT

Systems and methods consistent with the invention may include displaying, during debugging of source code having corresponding executable code, a screen including a first section, wherein a variable name included in the source code is displayed in a first format in the first section, receiving a user selection of the variable name, converting, by using a processor, the first format of the variable name to a second format in response to the received selection, wherein the variable name includes a plurality of characters and converting the first format of the variable name to the second format includes converting the characters to uppercase, searching for a corresponding variable name in the executable code, and displaying, on the display device, a second section including the corresponding variable name, wherein the variable name is displayed in a third format in the second section.

17 Claims, 6 Drawing Sheets

SYSTEMS AND METHODS FOR PROCESSING SOURCE CODE DURING DEBUGGING OPERATIONS

BACKGROUND

1. Relevant Field

Systems and methods consistent with the present invention generally relate to processing source code during debugging operations. More particularly, systems and methods consistent with the invention relate to processing source code by rendering variables included in source code in a selected format.

2. Background Information

Businesses and other organizations generate and/or receive a variety of entries, data items and electronic information (broadly referred to hereafter as "data objects") during the course of their operation. To organize and manage operations of the organization, the electronic information may be processed by a variety of computer programs and application programs including source code written by members of the organization. Members of the organization may perform debugging operations while writing the source code and/or when an error occurs during operation of an application program.

As operations of an organization increase and become more complex, the application programs used during the operations also increase in number and complexity. Further, debugging a complex application program may require a user to inspect and read hundreds of lines of codes and hundreds of variables and/or variable names that are rendered in uppercase in a display screen by a debugging software application or debugger. For example, FIG. 1 illustrates a debugger screen 100 that may include a source code section 102 and a symbol section 104.

Source code section 102 may render lines of source code during a debugging operation. The lines of source code may include a variable 106 having a variable name "ThisIsAnExample" and a variable 108 having a variable name "ThisIsAnotherExample." During execution, source code may be converted into executable code by, for example, a compiler. Variables 106 and 108 may be displayed in a format in which they were initially inputted when a programmer wrote the source code for the application program being analyzed. During a debugging operation, a user may input the text "ThisIsAnExample" in input field 110 or may double-click on "ThisIsAnExample" in source code section 102 to cause the debugger to inspect this particular variable. Symbol section 104 may be displayed or populated with data in screen 100 when the user selects a particular variable by either entering it in field 110 and/or double-clicking it in section 102. During such a selection, the debugger may convert the inputted text or the double-clicked variable into uppercase and may search for the selected variable name by using the uppercase variable as a search parameter. The converted uppercase variable name and its corresponding value is then displayed in symbol section 104. For example, when a user double-clicks on variable 106, "ThisIsAnExample" is converted to "THISISANEXAMPLE" to search the executable code for the variable name and its corresponding value. The converted variable name "THISISANEXAMPLE" is then displayed in cell 112 of symbol section 104 with a corresponding value in cell 114.

A user may then inspect and/or change the remaining attributes of the variable in symbol section 104 to determine a cause of an error of the source code being analyzed. Displaying multiple variable names in uppercase may reduce readability in symbol section 104 and may increase strain on a user analyzing the source code. Further, differentiating between similar variable names may be time-consuming and may increase resource costs of an organization.

In view of the foregoing, it is desirable to provide methods and systems for simplifying debugging operations.

SUMMARY

In accordance with one embodiment of the invention, a method for processing source code having corresponding executable code is provided. The method includes displaying, on a display device and during debugging of the source code, a screen including a first section, wherein a variable name included in the source code is displayed in a first format in the first section and the variable name includes a plurality of characters; receiving a user selection of the variable name; converting, by using a processor, the first format of the variable name to a second format in response to the received selection, wherein converting the first format of the variable name to the second format includes converting the characters to uppercase; searching for a corresponding variable name in the executable code by using the variable name in the second format as a search parameter; and displaying, on the display device, a second section including the corresponding variable name, wherein the variable name is displayed in a third format in the second section.

Consistent with another embodiment of the present invention, there is provided a system for processing source code having corresponding executable code. The system comprises a display device for displaying, during debugging of the source code, a screen including a first section, wherein a variable name included in the source code is displayed in a first format in the first section and the variable name includes a plurality character; an input device for receiving a user selection of the variable name; a memory device having instructions to modify the screen being displayed in the display device; and a data processor executing the instructions to generate executable code corresponding to the source code; convert the first format of the variable name to a second format in response to the received selection, wherein the variable name includes a plurality of characters and converting the first format of the variable name to the second format includes converting the characters to uppercase; search for corresponding variable name in the executable code by using the variable name in the second format as a search parameter; and display a second section including the corresponding variable name, wherein the variable name is displayed in a third format in the second section.

In accordance with another embodiment of the present invention, there is provided a computer-readable storage medium including instructions which, when executed on a processor, cause the processor to perform a method for processing source code having corresponding executable code. The method comprises displaying, during debugging of the source code, a screen including a first section, wherein a variable name included in the source code is displayed in a first format in the first section and the variable name includes a plurality of characters; receiving a user selection of the variable name; converting the first format of the variable to a second format in response to the received selection, wherein converting the first format of the variable name to the second format includes converting the characters to uppercase; searching for a corresponding variable name in the executable code by using the variable name in the second format as a search parameter; and displaying a second section including the corresponding variable name, wherein the variable name is displayed in a third format in the second section.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
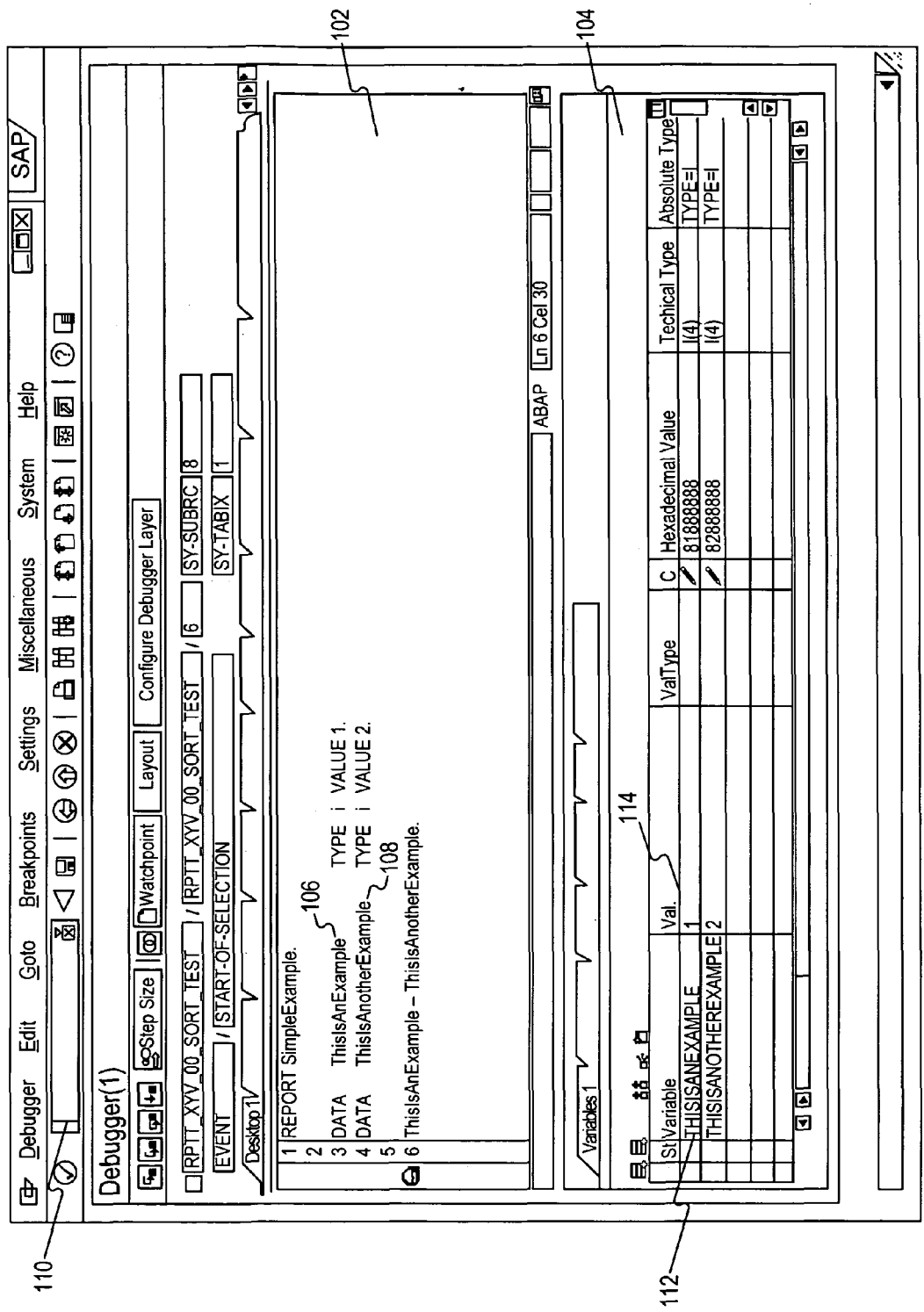
FIG. 1 illustrates a snapshot of a user interface screen rendered during a debugging operation.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to optimizing the processing of source code during a debugging operation. Exemplary debuggers that may be used in systems consistent with the invention include those offered by SAP AG, such SAP NetWeaver®. SAP NetWeaver® may integrate information and business processes across technologies and organizations using Internet standards, such as HTTP, XML, and Web services, and may process source code during a debugging operation. Systems consistent with the invention may thus be implemented as part of the debugging operations of, for example, SAP NetWeaver®.

Figure 2:
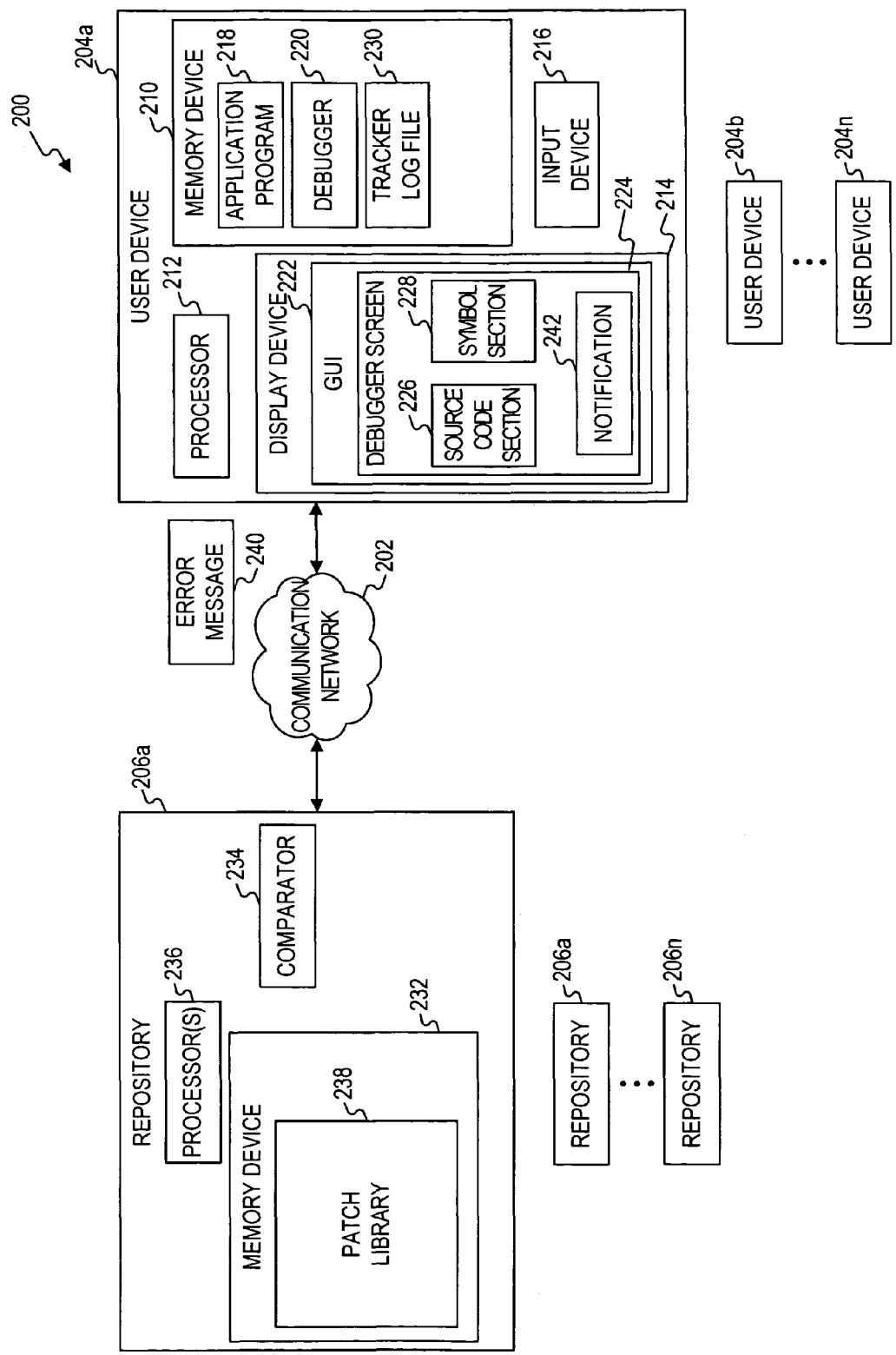
FIG. 2 illustrates an exemplary system for optimizing processing of source code during a debugging operation, consistent with the present invention.

FIG. 2 illustrates an exemplary debugging system 200 consistent with the invention. As shown in FIG. 2, system 200 includes a communication network 202 that facilitates communication between a plurality of nodes 204a-n and 206a-n.

Communication network 202 may include one or more network types, such as a wide-area network (WAN), a local-area network (LAN), or the Internet. Communication network 202 may operate by wireline and/or wireless techniques and may use transmission control protocol/internet protocol ("TCP/IP") or any other appropriate protocol to facilitate communication between nodes 204a-n and 206a-n of system 200. Network connections between the nodes of system 200 may be established via Ethernet, telephone line, cellular channels, or other transmission media.

Each node of system 200 may comprise a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components that will become apparent to those skilled in the art.

Consistent with an embodiment of the present invention, nodes 204a-n may be user devices 204a-n and nodes 206a-n may be repositories 206a-n. User device 204a may be an appropriate device for sending, receiving, and presenting data. For example, user device 204a may include a personal computer, workstation, mainframe computer, notebook, or a handheld device such as a cellular phone and a personal digital assistant.

As illustrated in FIG. 2, user device 204a may include a memory device 210, a processor 212, a display device 214, and an input device 216. Memory device 210 may be used to store instructions, such as an application program 218 and a debugger 220 which may be executed by processor 212 to cause user device 204a to implement a plurality of operations. For example, application program 218 may be executed on processor 212 to display a graphical user interface (GUI) 222 on display device 214. Input device 216 may be a keyboard, a mouse, a trackerball, a stylus, a voice recognition device, and/or a touch screen implemented in GUI 222. Processor 212 may also function as a compiler and may execute source code of application program 218 to generate executable code and/or compiled code.

Input device 216 and GUI 222 may allow a user of user device 204a to interface with at least a portion of system 200. For example, GUI 222 may display a debugger screen 224 during debugging of application program 218, and a user may use input device 216 to make a selection on debugger screen 224 to display a source code section 226 and a symbol section 228. Memory device 210 may also include a tracker log file 230 that may store a record of errors and/or corrections made to source code of application program 218. User device 204a may also include additional components, and user devices 204b-n may also include memory devices, processors, and application programs as described above with respect to user device 204a.

User devices 204a-n may communicate with repositories 206a-n via communication network 202. The communication may include sending data, such as requests to provide patches for errors detected in application program 218. Repository 206a may include a memory device 232, a comparator 234, and one or more processor(s) 236. Memory device 232 may include a patch library 238 and other application programs (not shown). Patch library 238 and application programs may be executed using processor(s) 236 and repository 206a may use comparator 234 to retrieve a correction patch in response to an error message 240 received from user device 204a.

Comparator 234 may compare descriptive information included in error message 240 with information stored in the patch library 238 to search for a correction patch specific to the error described in the error message.

Although the exemplary embodiment of system 200 is illustrated as having particular components arranged in a particular manner, one skilled in the art will appreciate that system 200 may include additional or fewer components that may be arranged differently. For example, user devices 204a-n and repositories 206a-n may include additional processors and/or memory devices. System 200 may be implemented as a standalone station such that instructions to implement comparator 234 and patch library 238 may be included in a single user device 204a. System 200 may be implemented without comparator 234 and patch library 238. System 200 may include additional user devices and/or repositories, and may be implemented in a client/server arrangement. Instructions corresponding to debugger 220 may be included in application program 218 and may be implemented as a single program. Memory devices 210 and 232 may include all forms computer-readable storage mediums such as of non-volatile or volatile memory, including, by way of example, non-transitory semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, debugger 220 may detect an error during operation of application program 218. For example, when processor 212 executes application program 218 by converting source code of application program 218 into executable code, application program 218 may perform a data dump at a certain code line of application program 218. Similarly, an error may be detected when the code corresponding to application program 218 includes an undefined variable and the execution of the code thus stops. Errors may also be caused by, for example, division of a variable by zero, use of an incorrect operator, memory access violation, improper resource allocation, buffer overflow, incorrect use of a null pointer, detection of an infinite and/or recursive loop, use of an uninitialized variable, a deadlock, a boundary condition, loss of arithmetic precision, race condition, and/or additional software errors that will become apparent to persons of ordinary skill in the art.

Upon detection of an error, debugger 220 and/or user device 204a may generate an error message 240 (which may be sent to repository 206a) based on the type of detected error. Error message 240 may be sent to repository 206a over communication network 202 and may include information describing a type of error. For example, error message 240 may include a signature identifying the type or error, a location of the error, and/or additional information that may facilitate searching for a correction patch.

Upon receipt of error message 240, repository 206a may pass the message to processor 236, where error message 240 may be decrypted and information included in the error message may be provided to comparator 234. Comparator 234 and/or processor 236 may access patch library 238 to search for correction patches based on the information retrieved from error message 240. For example, patch library 238 may include predetermined correction patches that may be specific to certain types of software errors.

Correction patches may include or may be stored with information that links the correction patches to the specific types of software errors. For example, a correction patch may be used to correct the error identified in error message 240 and may include a unique signature or some other form of identifier. Additional, information linked to or included in correction patches may also include key words that may be used by comparator 234 and/or processor 236 to search and compare information retrieved from error messages to information stored in patch library 238. Patch library 238 may also include instructions which may be used by repository 206a to generate or retrieve from an external device a new correction patch based on a specific type of error identified in error message 240.

Upon searching of patch library 238 based on the information included in error message 240, comparator 234 and/or processor 236 may identify a patch that may be used to correct the software error identified by the unique signature included in error message 240. In such a case, repository 206a may send the correction patch to user device 204a and debugger 220 may implement the correction patch to correct the error detected while running application program 218.

If the error detected in application program 218 is not corrected by the implementing a patch and/or a suitable patch is not found in patch library 238, a notification may be displayed on debugger screen 224, prompting a user to examine the source code of application program 218 to correct the error. Further, system 200 may be implemented without repositories 206a-n and a user of user device 204a may opt to examine the source code of application program 218 while the source code is being written. Thus, when a suitable patch is not available and/or a user opts to examine the source code of application program 218, debugger screen 224 may be displayed on GUI 222. Debugger screen 224 may be displayed automatically when no suitable patch is found and/or may be displayed when a user uses input device 216 to enter a selection for viewing source code of application program 218 and/or may be displayed automatically when an error is detected.

Debugger screen 224 may include a source code section 226. Source code section 226 may display the source code of application program 218 in a format in which a programmer wrote the source code. For example, if a programmer of application program 218 wrote a comment "REPORT SimpleExample" in line one of the source code of application program 218, source code section 226 may display the comment in the same format. A user of user device 204a may need to examine a particular variable and its attributes displayed in source code section 226. To do so, the user may double-click the variable and/or may enter the name of the variable by using input device 216. In response to the user's input, debugger 220 may change the format of the selected variable by converting the name of the variable to all uppercase. For example, if a name of the variable selected by the user was "ThisisanExample" debugger 220 may change the format of the variable name to "THISISANEXAMPLE."

Figure 3:
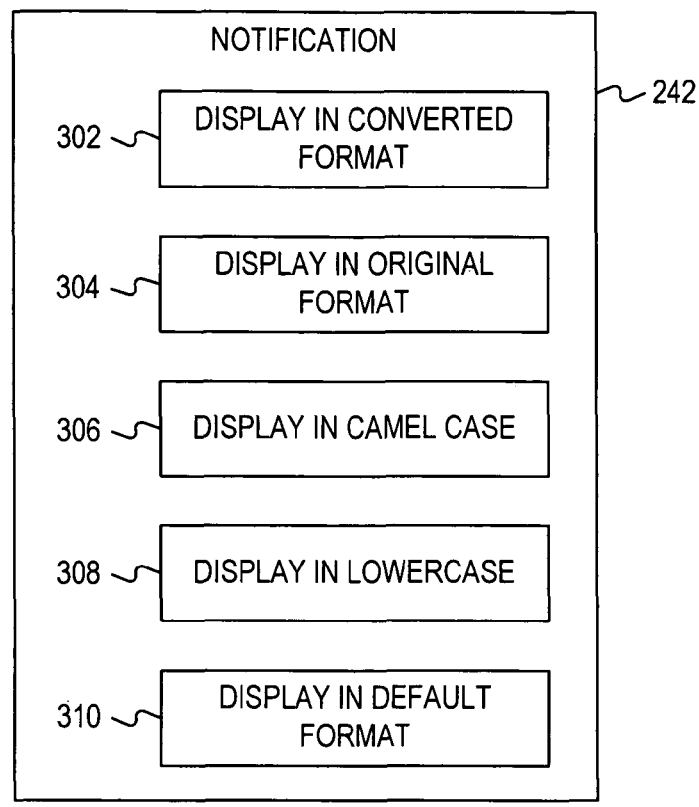
FIG. 3 illustrates an exemplary notification generated during a debugging operation, consistent with the invention.

Debugger 220 may use the variable name in the changed format as a search parameter to search for the corresponding variable name and other attributes of the variable from within the executable or compiled code corresponding to the source code of application program 218. The executable code or compiled code may be generated when, for example, processor 212 converts the source code of the application program 218 into an executable form. Once a variable name and/or additional attributes of the selected variable are found, a notification 242 may be displayed on debugger screen 224. Notification 242 may include a message indicating that the selected variable name and its attributes are ready to be displayed and may prompt a user of user device 204a to choose a format for display of the selected variable name. For example, as is illustrated in FIG. 3, notification 242 may have a first option 302, a second option 304, a third option 306, a fourth option 308, and a fifth option 310.

First option 302 may enable a user to choose that the selected variable name is displayed in the converted format that was used as the search criteria. For example, the selected variable name may be displayed in upper case. Second option 304 may enable a user to choose that the selected variable name is displayed in the original format. For example, the selected variable name may be displayed in the format that was used when the variable name was originally written in the source code of application program 218. Third option 306 may enable a user to choose that the selected variable name be displayed in camel case, where a first character of each word in the variable name may be displayed in uppercase. For example, a selected variable having the name "ThisisanExample" may be displayed as "ThisIsAnExample." The different words included in a selected variable name may be identified by, for example, processor 212 and/or debugger 220 by parsing and comparing the selected variable name with a database of words, such as a dictionary. Fourth option 308 may enable a user to choose that the selected variable name be displayed in all lowercase. Fifth option 310 may enable a user to choose that the selected variable name be displayed in a default format that may be a predetermined format previously chosen by a particular user and may be associated with a username and password of the user.

Returning now the FIG. 2, a user may use input device 216 to select an option displayed in notification 242, and depending on the selected option, debugger 220 may perform a conversion operation on the selected variable name. After receiving the user's selection, symbol section 228 may be displayed on debugger screen 224 and the selected variable name may be displayed in symbol section 228 in the selected format. Further, attributes of the selected variable name may also be displayed in symbol section 228.

Alternatively, debugger 220 may not display notification 242 and once attributes associated with the selected variable name are found in executable code after converting the variable to uppercase, debugger 220 may display the selected variable name in the same format as was used by a programmer when source code was written for application program 218. For example, if a programmer had defined a variable name as "ThisisanExample" in source code of application program 218, debugger 220 may first convert the variable name to all uppercase to search for the attributes, and may display the variable in its original format, "ThisisanExample," in symbol section 228, instead of displaying the variable name in the converted format of all uppercase.

After the selected variable name is displayed, a user may examine the variable and may correct the error in source code of application program 218. Once the error is corrected by the user and/or by a correction patch, a record of the correction along with an identity of the patch or the user may be made in tracker log file 230. Tracker log file 230 may also keep track of a correction patch selected by repository 206a and/or an option selected by a user with respect to a display format of the variable name, and may provide this information to debugger 220 during subsequent debugging operations. For example, debugger 220 may be prompted to re-use a previously used correction patch when a similar error is encountered and/or debugger 220 may be prompted to display a selected variable name in a previously selected format.

Figure 4:
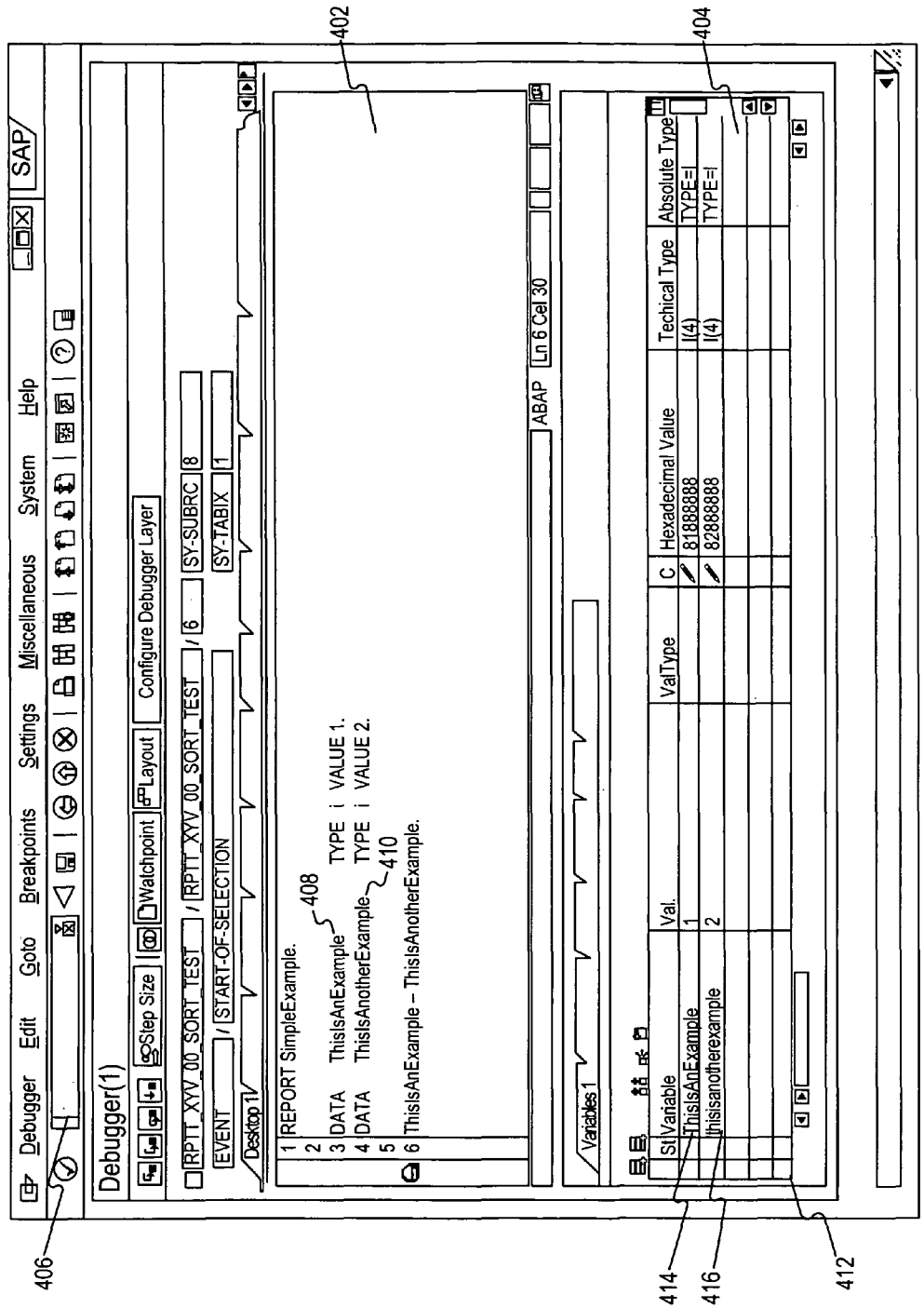
FIG. 4 illustrates a snapshot of an exemplary user interface screen rendered during a debugging operation, consistent with the invention.

FIG. 4 illustrates an exemplary screen 400 rendered during a debugging operation. Screen 400 may be displayed on, for example, display device 214 of system 200. Screen 400 may include a source code section 402, a symbol section 404, and an input field 406. Source code section 402 may render lines of source code during a debugging section. The lines of source code may include a variable 408 having a variable name "ThisIsAnExample" and a variable 410 having a variable name "ThisIsAnotherExample." Names of variables 408 and 410 may be displayed in a format in which they were initially inputted when a programmer wrote source code for the application program being debugged. For example, as is illustrated in FIG. 4, the name of variable 408 may be displayed in camel case after the different words included in the variable name may be identified by a comparison between the words and a dictionary and/or word database.

Symbol section 404 may include a table 412 that may display names of variables included in source code section 402. For example, variable names 414 and 416 may be displayed after a user double-clicks on corresponding variables 408 and 410 in source code section 402 or after the user enters the name of a particular variable in input field 406. Each row in table 412 may correspond to a variable included in source code section 402, and columns in table 412 may include attributes corresponding to a selected variable. Variable names 414 and 416 may be displayed in a format selected by a user and/or chosen based on a default setting. For example, variable name 414 may be displayed in camel case because a default setting may be to display variable names in the same format that was used during writing of the source code. Further, variable name 416 may be displayed in all lower case because a user may have selected to display variable name 416 in a format different from the one used during writing of the source code.

Figure 5:
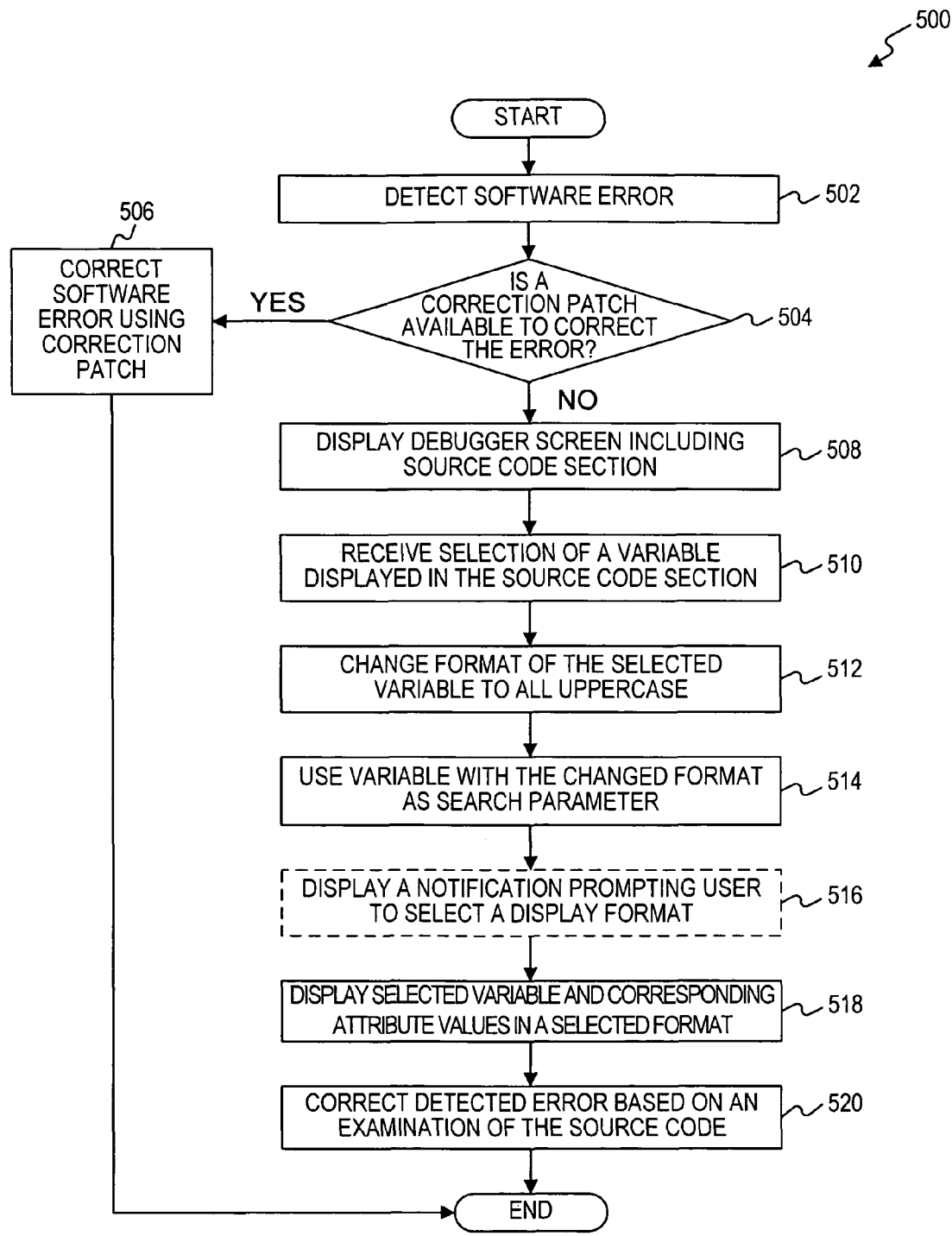
FIG. 5 illustrates a flowchart illustrating an exemplary process 500 for optimizing processing of source code during a debugging operation, consistent with the present invention.

Referring now to FIG. 5, it illustrates an exemplary flowchart of a process 500 for optimizing processing of source code during a debugging operation. Process 500 may be implemented using system 200. The process may begin in step 502, where a software error may be detected. The software error may be detected during, for example, execution of an application program having source code. The source code may be converted into executable code during the execution. Next, it may be determined in step 504 if a correction patch may be available to correct the error. The method may proceed to step 506 when a correction patch may be available to correct the software error detected in step 502 and the software error may be corrected (step 504: Yes).

Alternatively, the method may proceed to step 508 when a correction patch may not be available to correct the error (step 504: No). A correction patch may be determined to not be available when, for example, application of a correction patch fails to correct the error, no correction patch is available, or a user chooses to examine the source code without opting to exercise the option to use a correction patch. In step 508, a debugger screen including a source code section may be displayed. The debugger screen may display various lines of source code in a format in which a programmer of the source code wrote the source code. In step 510, a selection of a variable name displayed in the source code section may be received from a user. The selection may be received based on a double-click by a user or based on an input of a variable name entered by the user. Next, in step 512, the format of the selected variable name may be changed to all uppercase. In step 514, the variable name with the changed format may be used as a search parameter to search for the corresponding variable name and/or attribute values of the selected variable name in the executable code. Next, in step 516, a notification may be displayed prompting the user to select a format in which the user wishes the selected variable name to be displayed. As is illustrated in FIG. 5 with a dotted line, step 516 may be an optional step, and instead of receiving a selection of a format from the user, a selection may be automatically made by the system implementing process 500.

In step 518, the selected variable name and corresponding attribute values may be displayed in a particular format selected by the user and/or the system. For example, the selected variable name may be displayed in the same format as was originally used by a programmer of the source code to define the variable name, the selected variable name may be displayed in all uppercase, or the selected variable name may be displayed in all lower case. In step 520, the error may be corrected based on an examination of the source code by the user, and the process may end.

Figure 6:
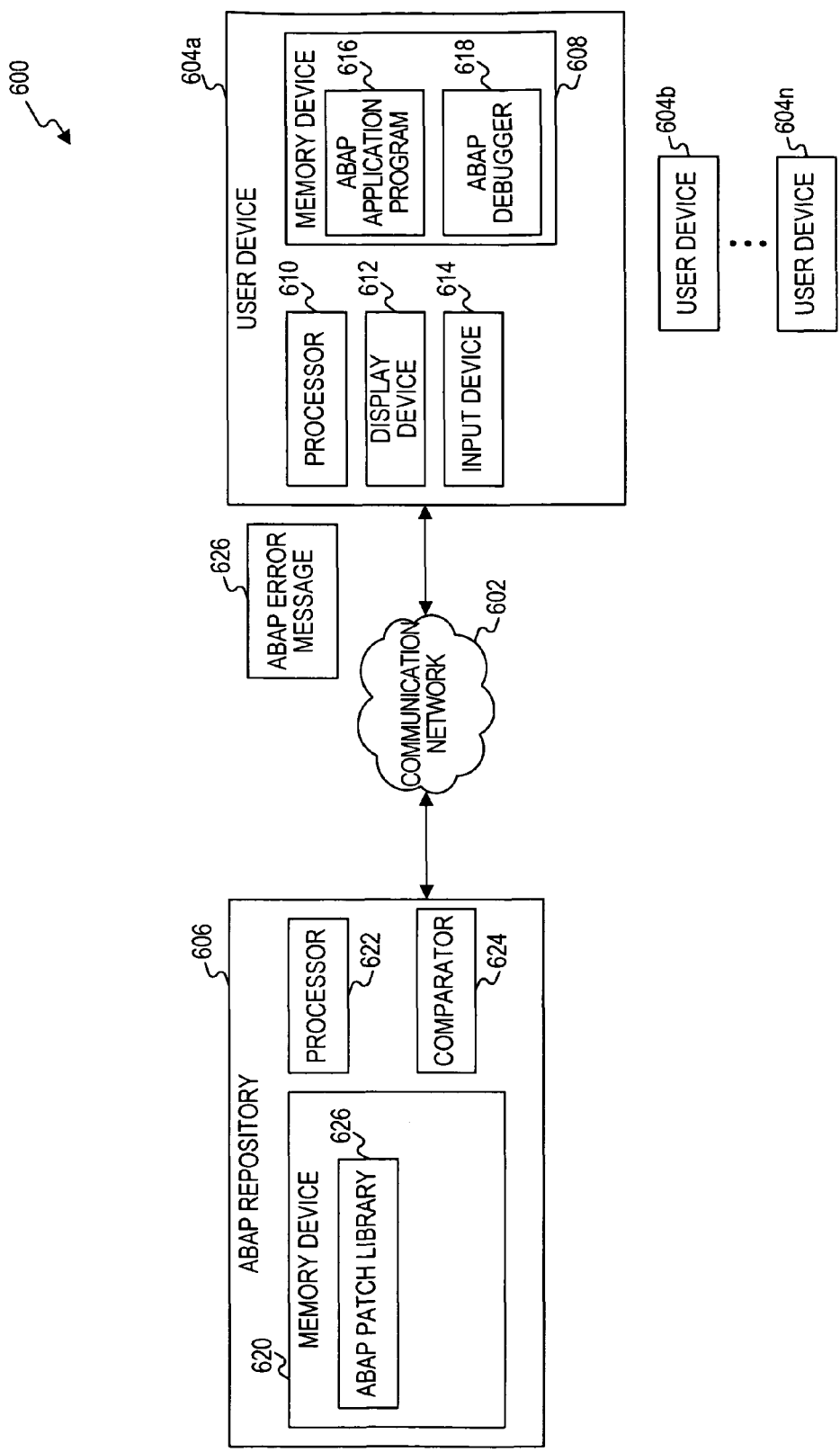
FIG. 6 illustrates an exemplary system for optimizing processing of source code during a debugging operation based on Advanced Business Application Programming (ABAP) language, consistent with the present invention.

FIG. 6 illustrates an exemplary system for optimizing processing of source code during debugging of an ABAP application program. System 600 may include components similar to the ones disclosed in FIG. 2. For example, system 600 may include a communication network 602 that facilitates communication between user device 604*a-n* and ABAP repository 606. User device 604*a* may include a memory device 608, a processor 610, a display device 612, and an input device 614.

Memory device 608 may be used to store instructions, such as an ABAP application program 616 and an ABAP debugger, which may be executed by processor 610 to cause user device 604*a* to implement a plurality of operations. ABAP application program 616 may be based on a concept of Logical Databases (LDBs), which facilitate in extraction of data from specific databases. For example, ABAP application program 616 may be customized for specific end-users and may be used to interface with databases specific to a particular organization and/or an end user and processor 610 may be configured to operate as database interface during operation of ABAP application program 616. System 600 may also include an ABAP repository node 606, which may include a memory device 618, a processor 620, and a comparator 624. Memory device 620 may include an ABAP patch library 626.

Consistent with an embodiment of the invention, system 600 may operate similar to system 200 and may generate ABAP debugger screens (not shown) on display device 612. For example, as is described in detail above with respect to system 200, user device 604*a* may generate an ABAP error message 626. ABAP error message 626 may be received by ABAP repository 606 and an ABAP correction patch may be returned to correct an error detected by ABAP debugger 618. The ABAP debugger screens displayed on display device 612 may include a source code section and a symbol section that may display variable names in a particular format based on a selection by a user and/or a default setting that may enhance readability of the source code during debugging operations.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable storage media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method of processing source code having corresponding executable code, comprising:
    displaying, on a display device and during debugging of the source code, a screen including a first section, wherein a variable name included in the source code is displayed in a first format in the first section and the variable name includes a plurality of characters;
    receiving a user selection of the variable name;
    converting, by using a processor, the variable name from the first format to a second format in response to the user selection, the variable name identifying a variable implemented in the source code, wherein converting the first format of the variable name to the second format includes converting the characters to uppercase;
    searching for a corresponding variable name in the executable code by using the variable name in the second format as a search parameter; and
    displaying, on the display device, a second section including the corresponding variable name, wherein the variable name is displayed in a third format in the second section, and displaying the variable name in the third format includes converting a first character of a word in the variable name to uppercase, and converting a second character of the word to lowercase.

2. The method of claim 1, wherein the first section is a source code section for displaying source code and the second section is a symbol section for displaying the variable name and a value of the variable.

3. The method of claim 1, wherein the first section is displayed after detection of an error in the source code.

4. The method of claim 1, wherein displaying the variable name in the third format includes converting the characters from uppercase to lowercase.

5. The method of claim 1, wherein displaying the variable in the third format includes converting the characters from uppercase to camel case.

6. The method of claim 1, wherein the first format is a predetermined format used to define the variable name during writing of the source code.

7. The method of claim 6, wherein the third format is the same as the first format, and displaying the variable name in the third format includes selecting the variable name from the first section for display in the second section after searching for the corresponding variable name has been completed by using the variable name in the second format.

8. The method of claim 1, further comprising:
displaying a notification after searching for the corresponding variable name has been completed by using the variable name in the second format, the notification prompting a user to select a format for displaying the variable name in the second section;
receiving the selection of the format; and
displaying the variable name in the second section and in the third based on the selection of the format by the user.

9. The method of claim 1, further comprising:
detecting an error in the source code during operation of an application program based on the source code;
generating an error message including descriptive information describing the detected error; and
displaying the screen when a correction patch is not available to correct the error, wherein the correction patch is searched for by using the descriptive information.

10. A system for processing source code having corresponding executable code, comprising:
a display device for displaying, during debugging of the source code, a screen including a first section, wherein a variable name included in the source code is displayed in a first format in the first section and the variable name includes a plurality characters;
an input device for receiving a user selection of the variable name;
a memory device having instructions to modify the screen being displayed in the display device; and
a data processor executing the instructions to:
convert the first format of the variable name to a second format in response to the user selection, the variable name identifying a variable implemented in the source code, wherein the variable name includes a plurality of characters and converting the first format of the variable name to the second format includes converting the characters to uppercase;
search for a corresponding variable name in the executable code by using the variable name in the second format as a search parameter; and
display a second section including the corresponding variable name, wherein the variable name is displayed in a third format in the second section, and displaying the variable name in the third format includes converting a first character of a word in the variable name to uppercase, and converting a second character of the word to lowercase.

11. The system of claim 10, wherein displaying the variable name in the third format includes converting the characters from uppercase to camel case.

12. The system of claim 10, wherein the first format is a predetermined format used to define the variable name during writing of the source code.

13. The system of claim 10, wherein the third format is identical to the first format, and displaying the variable name in the third format includes selecting the variable name from the first section for display in the second section after searching for the corresponding variable name has been completed by using the variable name in the second format.

14. A non-transitory computer-readable storage medium comprising instructions, which when executed on a processor, cause the processor to perform a method of processing source code having corresponding executable code, the method comprising:
displaying, during debugging of the source code, a screen including a first section, wherein a variable name included in the source code is displayed in a first format in the first section and the variable name includes a plurality of characters;
receiving a user selection of the variable name;
converting the first format of the variable to a second format in response to the user selection, the variable name identifying a variable implemented in the source code, wherein converting the first format of the variable name to the second format includes converting the characters to uppercase;
searching for a corresponding variable name in the executable code by using the variable name in the second format as a search parameter; and
displaying a second section including the corresponding variable name, wherein the variable name is displayed in a third format in the second section, and displaying the variable name in the third format includes converting a first character of a word in the variable name to uppercase, and converting a second character of the word to lowercase.

15. The computer-readable storage medium of claim 14, wherein displaying the variable name in the third format includes converting the characters from uppercase to camel case.

16. The computer-readable storage medium of claim 14, wherein the first format is a predetermined format used to define the variable name during writing of the source code.

17. The computer-readable storage medium of claim 14, wherein the third format is identical to the first format, and displaying the variable name in the third format includes selecting the variable name from the first section for display in the second section after searching for the corresponding variable name has been completed by using the variable name in the second format.

* * * * *